(12) United States Patent
Yamada et al.

(10) Patent No.: US 6,841,912 B2
(45) Date of Patent: Jan. 11, 2005

(54) PERMANENT MAGNET ROTOR

(75) Inventors: Kazuyuki Yamada, Wako (JP); Minoru Matsunaga, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/657,083

(22) Filed: Sep. 9, 2003

(65) Prior Publication Data

US 2004/0051416 A1 Mar. 18, 2004

(30) Foreign Application Priority Data

Sep. 13, 2002 (JP) ........................................ 2002-267686

(51) Int. Cl.⁷ .............................................. H02K 21/12
(52) U.S. Cl. ............................. 310/156.28; 310/156.11
(58) Field of Search ........................ 310/156.28, 156.11, 310/156.22, 156.29, 156.31

(56) References Cited

U.S. PATENT DOCUMENTS

| | | | | |
|---|---|---|---|---|
| 2,927,229 A | * | 3/1960 | Merrill .................... 310/162 |
| 4,667,123 A | * | 5/1987 | Denk et al. ............ 310/156.22 |
| 4,908,347 A | * | 3/1990 | Denk ..................... 505/166 |
| 4,910,861 A | * | 3/1990 | Dohogne ............... 29/598 |
| 4,942,322 A | * | 7/1990 | Raybould et al. ...... 310/156.11 |
| 5,233,252 A | * | 8/1993 | Denk ..................... 310/254 |
| 5,292,284 A | * | 3/1994 | Denk et al. ............ 464/29 |
| 5,424,632 A | * | 6/1995 | Montagu ............... 324/146 |
| 5,936,324 A | * | 8/1999 | Montagu ............... 310/156.11 |

FOREIGN PATENT DOCUMENTS

| JP | 11-234975 | 8/1999 |
|---|---|---|
| JP | 2000-130176 | 5/2000 |

* cited by examiner

*Primary Examiner*—Dang Le
(74) *Attorney, Agent, or Firm*—Squire, Sanders & Dempsey L.L.P.

(57) ABSTRACT

In a permanent magnet rotor, a power transmitting shaft is connected to an axial end of a solid cylindrical permanent magnet, and a reinforcement sleeve is fitted on the outer circumferential surface of the permanent magnet. Thus, the shaft is not required to be passed through the permanent magnet as was the case with the conventional permanent magnet rotor for the purpose of transmitting the rotational torque and increasing the overall rigidity, and the increase in the axial dimension of the rotor due to the reduction in the cross sectional area of the permanent magnet can be avoided. Also, because the sleeve surrounds the permanent magnet, the resistance to centrifugal stress resulting from a high speed rotation and repeated bending stress owing to vibrations can be improved.

6 Claims, 2 Drawing Sheets

180# PERMANENT MAGNET ROTOR

TECHNICAL FIELD

The present invention relates to a rotor including a solid cylindrical permanent magnet for use in electric generators and motors.

BACKGROUND OF THE INVENTION

The mechanical losses such as a bearing friction loss and a brush friction loss account for an increasingly large portion of the internal loss of a rotor for an electric generator or motor as the size of the rotor gets smaller. Therefore, smaller rotors having a diameter of 5 mm or less often consist of permanent magnet rotors that do not required brushes. The rotor shaft for such a rotor is required to have a certain diameter that is necessary for transmitting the load or drive torque. It is therefore conceivable to use a support shaft that is passed centrally through a cylindrical permanent magnet as disclosed in Japanese patent laid open publication No. 2000-130176. This is suitable for achieving a high mechanical strength in the connection between the shaft and permanent magnet. However, according to this structure, the cross sectional area of the permanent magnet diminishes by the cross sectional area of the support shaft, and the axial dimension of the permanent magnet is required to be increased to ensure an adequate magnetic flux required to produce an adequate torque without increasing the outer diameter of the permanent magnet.

To overcome such a problem, it is possible to press fit a cylindrical permanent magnet into a sleeve, fit bearing support portions into either axial ends of the sleeve, bond the bearing support portions with the corresponding axial ends of the permanent magnets that are recessed from the corresponding axial ends of the sleeve, and weld the peripheral part of each bearing support portion to the corresponding annular edge of the sleeve, as disclosed in Japanese patent laid open publication No. 11-234975.

However, according to the structure disclosed in Japanese patent laid open publication No. 11-234975, because the rotor is indirectly connected to the drive source consisting of a turbine via the bearing support portion, not only the axial dimension cannot be reduced but also a significant amount of eddy current loss is inevitable because the sleeve is made of metallic material even though it may not be a magnetic material.

BRIEF SUMMARY OF THE INVENTION

In view of such problems of the prior art, a primary object of the present invention is to provide an improved permanent magnet rotor which is suited for both low rotational speeds and high rotational speeds in excess of 10,000 rpm.

A second object of the present invention is to provide a permanent magnet rotor which can minimize eddy current loss.

A third object of the present invention is to provide a permanent magnet rotor which can reduce both radial and axial dimensions.

According to the present invention, at least one of the objects can be accomplished by providing a permanent magnet rotor, comprising: a solid cylindrical permanent magnet; a power transmitting member connected to an axial end of the permanent magnet, and a reinforcement sleeve fitted on an outer circumferential surface of the permanent magnet.

By thus directly connecting the permanent magnet to the power transmitting member which typically consists of a shaft, a shaft member is not required to be passed through the permanent magnet as was the case with the conventional permanent magnet rotor for the purpose of transmitting the rotational torque and increasing the overall rigidity, and the increase in the axial dimension of the rotor due to the reduction in the cross sectional area of the permanent magnet can be avoided. Also, because the sleeve surrounds the permanent magnet, the resistance to centrifugal stress resulting from a high speed rotation and repeated bending stress owing to vibrations can be improved. The reinforcement sleeve may be made of fiber reinforced plastic material which is electrically non-conductive so that eddy current loss can be avoided.

It is advantageous if the power transmitting member comprises a shaft member extending continuously from the permanent magnet, and the reinforcement sleeve overlaps a certain length of the shaft member. Because of the presence of the overlap, the part at which the power transmitting member is connected to the axial end of the permanent magnet is prevented from becoming susceptible to a mechanical failure owing to the reinforcing action of the overlapping portion of the sleeve. Experimentally, it was demonstrated that the overlap length should be selected such that L/D is 0.14 or greater where L is the overlap length, and D is an outer diameter of the permanent magnet.

According to a preferred embodiment of the present invention, the power transmitting member is connected to the axial end of the permanent magnet by brazing. In particular, it is preferable if two different brazing materials are applied to opposing ends of the permanent magnet and the power transmitting member, respectively, the brazing materials being separated by a partition wall member. The two different brazing materials can be selected so as to suit the material of the member which is to be brazed, and the partition wall member serves both as a stress buffering material to minimize stresses arising from thermal expansion at the time of brazing and as a partition wall for preventing the mixing of the two different brazing materials and thereby preventing the properties of the brazing materials from being adversely affected.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
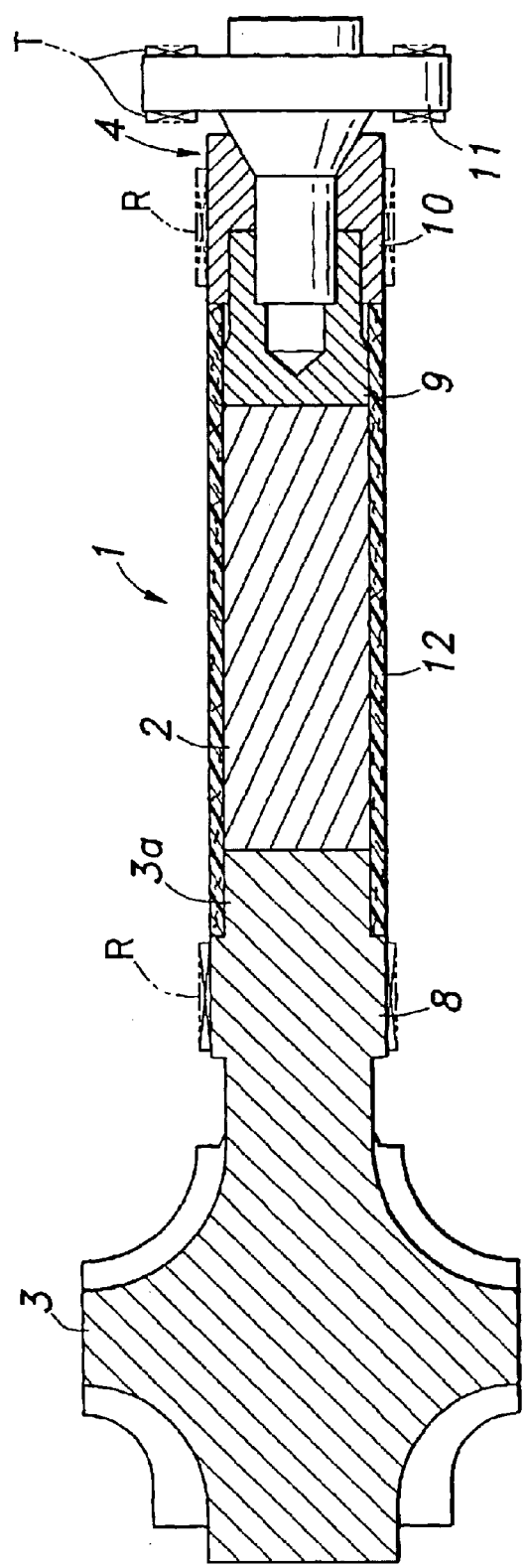
FIG. 1 is a sectional view of a rotor embodying the present invention.

FIG. 1 shows a permanent magnet rotor having a turbine integrally formed therewith. This rotor 1 consists of a rotor for an electric generator driven by a small power plant consisting of a gas turbine engine, and comprises a cylindrical permanent magnet 2 and a shaft 3a of a turbine 3, the shaft 3a serving as a power transmitting member directly connected to an axial end surface of the permanent magnet 2. In this embodiment, the permanent magnet 2 consists of neodymium iron boron permanent magnet material (Nd15; Fe77; B8), but other permanent magnet materials such as samarium cobalt permanent magnet material may also be used to implement the present invention without substantially modifying the arrangements associated with the bonding of various parts by brazing.

A bearing support assembly 4 is connected to the other axial end surface of the permanent magnet 2. This provides a highly compact structure. The turbine 3 may be made of ceramic material such as silicon nitride and silicon carbide or heat resistance metallic material such as Inconel (Ni-based Ni—Cr—Fe alloy).

Figure 2:
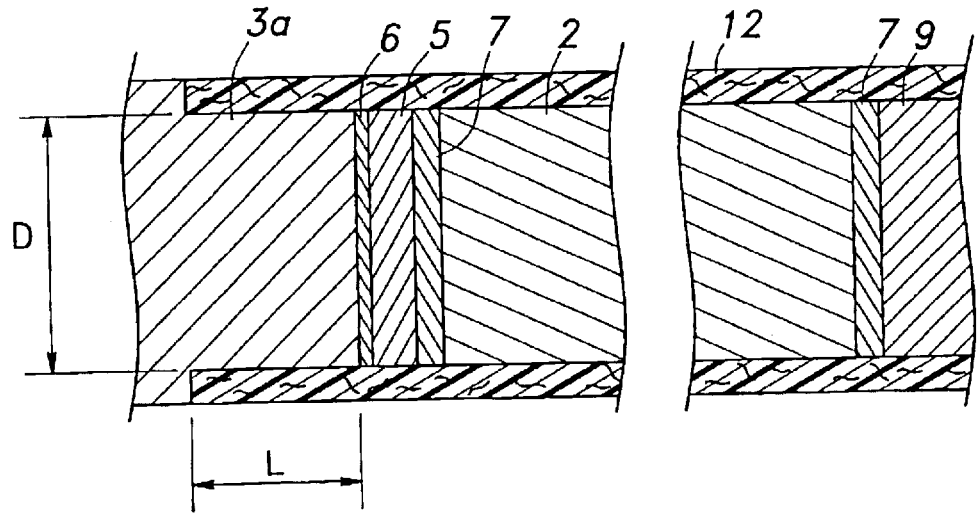
FIG. 2 is an enlarged sectional view showing the brazed parts.

Referring to FIG. 2, the shaft 3a of the turbine 3 and permanent magnet 2 are joined to each other by using active brazing material. For instance, when the turbine 3 is made of silicon nitride ($Si_3N_4$), a silver brazing material containing active metals (Ag60; Cu24; In14; Ti2) 6 is applied to the shaft 3a while a neodymium brazing material (Nd70; Cu25; Al15) 7 is applied to the permanent magnet 2, and these two brazing materials are joined to each other via a Koval layer (Fe—Ni—Co alloy) 5 that serves as a stress buffering material to minimize stresses arising from thermal expansion at the time of brazing and a partition wall for separating the two different brazing materials. It should be noted that the shaft 3a, brazing materials 6 and 7 and Koval layer 5 jointly define a smooth cylindrical outer surface having a uniform outer diameter.

The bonding consisting of sliver brazing is carried out abutting a disk (having a thickness of 50 μm) made of the silver brazing material to a corresponding end surface of the shaft 3a of the turbine 3, and a disk (having a thickness of 500 μm) made of Koval on the outer end surface of the sliver brazing material. The end surface of the shaft 3a may have a surface roughness in the range of 0.8 s to 3.2 s, and the end surfaces of the Koval disk may have a surface roughness in the range of 3.2 s to 25 s.

The assembly was then heated in vacuum environment ($1\times10^{-4}$ to $1\times10^{-6}$ torr or $1.33\times10^{-2}$ to $1.33\times10^{-3}$ Pa) from the room temperature to a maintaining temperature of 680° C. at the rate of 10° C. per minute, maintaining the temperature at 680° C. for one hour, and letting the brazing material cool naturally. During this heating process, the assembly was subjected to a bonding load of 0.1 MPa to 0.5 MPa. As a result of this heating process, the thickness of the silver brazing material 6 was reduced to approximately 15 μm, and demonstrated some segregation.

Material analysis indicated that diffusion of Ni from the Koval disk into the silver brazing material occurred. The interface between the shaft 3a made of the ceramic material and silver brazing material 6 was relatively clearly defined, and the reaction layer between the materials of these two parts extended over a thickness of 3 μm or less and contained some segregation of Ti.

The bonding consisting of silver brazing is carried out by abutting a disk (having a thickness of 50 μm) made of the silver brazing material to a corresponding end surface of the shaft 3a of the turbine 3, and a disk (having a thickness of 500 μm) made of Koval on the outer end surface of the silver brazing material. The end surface of the shaft 3a may have a surface roughness in the range of 0.8 s to 3.2 s, and the end surfaces of the Koval disk may have a surface roughness in the range of 3.2 s to 25 s.

The assembly was then heated in vacuum environment ($1\times10^{-4}$ to $1\times10^{6}$ torr or $1.33\times10^{-2}$ to $1.33\times10^{-3}$ Pa) from the room temperature to a maintaining temperature of 390° C. at the rate of 5° C. per minute, maintaining the temperature at 390° C. for one hour, and letting the brazing material cool naturally. During this heating process, the assembly was subjected to a bonding load of 0.1 MPa to 0.5 MPa. As a result of this heating process, the thickness of the neodymium brazing material 7 was reduced to approximately 33 μm.

When Inconel is used for the material of the turbine 3, a silicone nitride layer having a thickness of about 0.5 mm may be formed in addition to the Koval layer 5 shown in FIG. 2 as a buffering material for thermal expansion.

A journal portion 8 for a radial bearing R may be formed in a part of the shaft 3a of the turbine 3 adjacent to the junction between the shaft 3a and permanent magnet 2 as shown in FIG. 1.

On the side of the bearing support assembly 4, a connecting member 9 made of Koval is connected to the permanent magnet 2 via a neodymium brazing material (Nd70; Cu25; Al15) 7 as shown in FIG. 2. The neodymium brazing of the connecting member 9 to the other end of the permanent magnet 2 via the neodymium brazing material 7 is carried out similarly as the bonding between the Koval layer 5 and the permanent magnet 2 on the other end of the permanent magnet 2 described earlier. Referring to FIG. 1, the other axial end of the connecting member 9 is connected to the bearing support assembly 4. The bearing support assembly 4 includes a journal member 10 for a radial bearing R fitted on a free end of the connecting member 9, and a thrust bearing member 11 having a stem portion which is fitted into an inner central bores formed in the opposing end of the connecting member 9 and through the journal member 10 and a radial flange formed on the end of the stem portion remote from the connecting member 9 to support thrust bearings T. The journal member 10 may be made of ceramic material and attached to the connecting member 9 by using a bonding agent. The thrust bearing member 11 may be fixed in place by press fitting the stem portion into the central bore of the connecting member 9 or by using threaded fasteners.

The permanent magnet 2 is press fitted into a sleeve 12 made of plastic material reinforced by such fibers as carbon fibers, Kevler fibers and PBO fibers to protect the permanent magnet 2 from centrifugal stresses. The sleeve 12 may also be made of non-magnetic metallic material and thermally shrink fit on the permanent magnet 2, but the use of the non-magnetic, fiber-reinforced plastic material eliminates the problem of eddy current loss.

The permanent magnet 2 preferably consists of a one-piece member, but may also consist of a plurality of pieces separated by planes vertical to or parallel with the axial line.

To minimize stresses at the bonding surface bonded by brazing, the overlap of the sleeve 12 fitted on the shaft 3a of the turbine 3 may be selected appropriately. More specifically, it was found that no breakage occurs if L/D is 0.14 or greater as shown in Table 1 which compares the L/D values with the occurrence/non-occurrence of breakage where D is the diameter of the rotor 1 and L is the overlap of the sleeve 12 with the shaft 3a. The maximum radial tensile stress in the rotor 1 occurs in the cross section adjoining the axial end of the sleeve 12, and the stress acting upon the brazing bonding surface can be controlled so as to not to be damaging by appropriately selecting the L/D value. There is no upper limit to the L/D value in terms of mechanical strength, but is preferred to be less than 1 because an excessive axial length of the sleeve would cause a layout problem.

TABLE 1

| overlap L (mm) | shaft diameter D (mm) | L/D | broken: X intact: O |
| --- | --- | --- | --- |
| 10 | 3.6 | 2.78 | O |
| 5 | 3.6 | 1.39 | O |
| 2 | 3.6 | 0.56 | O |
| 1.5 | 3.6 | 0.42 | O |
| 1 | 3.6 | 0.28 | O |
| 0.5 | 3.6 | 0.139 | X |
| 0 | 3.6 | 0.00 | X |
| 10 | 10 | 1.00 | O |
| 5 | 10 | 0.50 | O |
| 2 | 10 | 0.20 | O |
| 1.5 | 10 | 0.15 | O |
| 1 | 10 | 0.10 | X |
| 0.5 | 10 | 0.05 | X |
| 0 | 10 | 0.00 | X |

Figure 3:
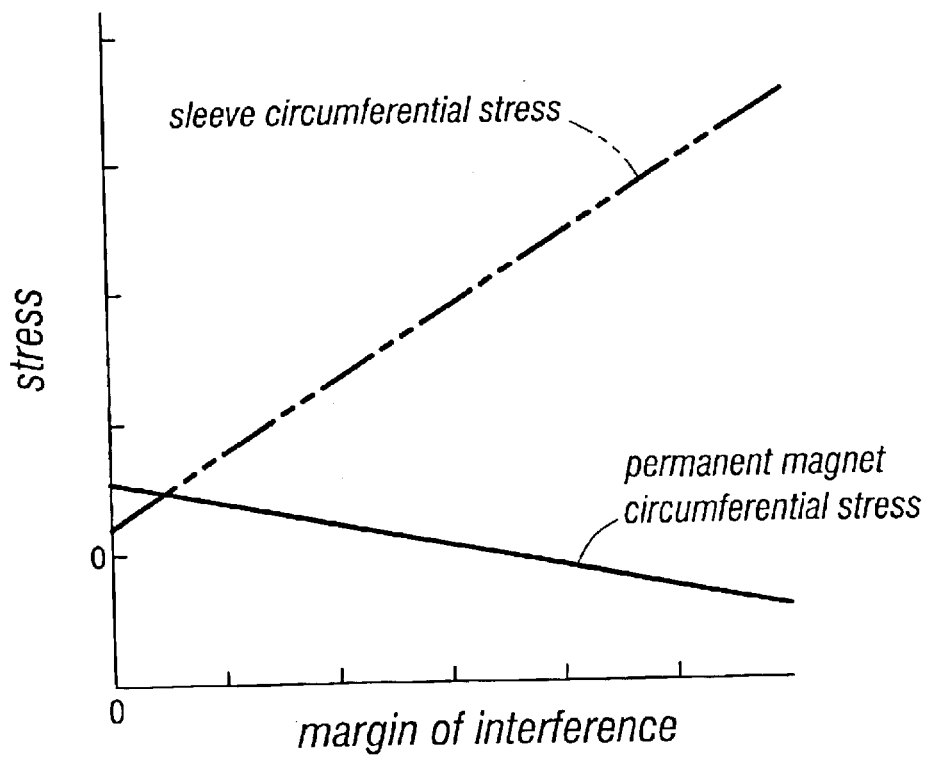
FIG. 3 is a graph showing the relationship between the margin of interference fit and stress that is produced.

By suitably selecting the constricting force of the sleeve 12, a suitable amount of compressive stress may be applied to the permanent magnet 2, and damage to the permanent magnet 2 can be avoided by canceling the centrifugal stress acting on the permanent magnet 2 as it rotates at high speed with this compressive stress. In other words, the outer diameter of the permanent magnet 2 is slightly larger than the inner diameter of the sleeve 12 so that an interference fit is achieved between the permanent magnet 2 and sleeve 12, and a constricting stress is produced in the sleeve when the permanent magnet 1 is press fitted into the sleeve 12. The stress that is produced depends on the material properties of the permanent magnet 2 and sleeve 12. It is important to design so that the compressive stress produced in the permanent magnet 2 is greater than the centrifugal stress when the rotor 1 is rotating at the maximum rotational speed. FIG. 3 shows the relationship between the margin of the interference fit between the permanent magnet 2 and sleeve 12 and the stress that is produced.

The other end of the sleeve 12 also overlaps a certain length of the connecting member 9, and this also contributes to the reinforcement of the bonding between the permanent magnet 2 and connecting member 9. In this embodiment, the outer surface of the sleeve 12 continuously connects to the outer circumferential surface of the journal member 10.

The radial bearing R was mounted on the shaft 3a in the foregoing embodiment, but it is also possible to fit the radial bearing on the sleeve 12 because the sleeve 12 surrounds the outer circumferential surface of the permanent magnet 2.

The rotor 1 using a permanent magnet 2 according to the present invention can be used not only in electric generators but also in electric motors in which the rotor itself serves as a drive source. The permanent magnet 2 serves as a load source in case of an electric generator and as a drive source in case of an electric motor. The power transmitting shaft is preferred to be integral with the drive source such as a turbine wheel or with the load source such as a flywheel, but may consist of a member connected to such members by suitable means.

According to the foregoing embodiment of the present invention, because the shaft is not required to be passed through the rotor, an adequate volume for the permanent magnet that is required to provide an adequate amount of magnetic flux can be ensured without increasing the axial dimension. Furthermore, because the power transmitting shaft and permanent magnet are integrally joined to each other by brazing, and the bonded part and permanent magnet are protected from the centrifugal stress by the sleeve, the permanent magnet rotor having a drive source or load source integrally attached thereto can be designed as a highly compact unit. If the sleeve is made of fiber-reinforced plastic material which is electrically non-conductive, the eddy current loss can be avoided.

Although the present invention has been described in terms of a preferred embodiment thereof, it is obvious to a person skilled in the art that various alterations and modifications are possible without departing from the scope of the present invention which is set forth in the appended claims.

What is claimed is:

1. A permanent magnet rotor comprising:
    a solid cylindrical permanent magnet;
    a power transmitting member connected to an axial end of said permanent magnet, and
    a reinforcement sleeve fitted on an outer circumferential surface of said permanent magnet,
    wherein said power transmitting member is connected to said axial end of said permanent magnet by brazing.

2. A permanent magnet rotor according to claim 1, wherein said reinforcement sleeve is made of fiber reinforced plastic material.

3. A permanent magnet rotor according to claim 1, wherein said power transmitting member comprises a shaft member extending continuously from said permanent magnet, and said reinforcement sleeve overlaps a certain length of said shaft member.

4. A permanent magnet rotor according to claim 3, wherein said length is selected such that L/D is 0.14 or greater where L is said overlap length, and D is an outer diameter of said permanent magnet.

5. A permanent magnet rotor according to claim 1, wherein two different brazing materials are applied to opposing ends of said permanent magnet and said power transmitting member, respectively, said brazing materials being separated by a partition wall member.

6. A permanent magnet rotor according to claim 1, wherein an outer diameter of said permanent magnet is slightly larger than an inner diameter of said reinforcement sleeve before assembly thereof.

* * * * *